Jan. 11, 1927.　　　　1,613,719
B. PLATSCHICK
BACKPLATE FOR ARTIFICIAL TEETH
Filed Feb. 15, 1924
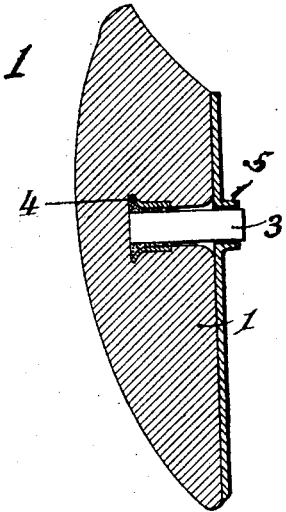
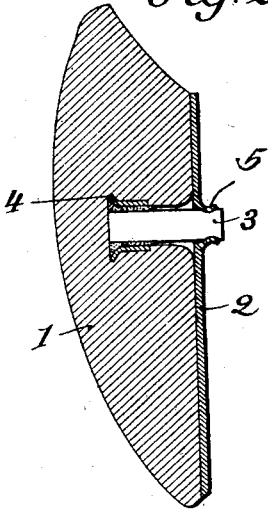
Inventor
B. Platschick
By Marks & Clerk
Attys.

Patented Jan. 11, 1927.

1,613,719

UNITED STATES PATENT OFFICE.

BENVENUTO PLATSCHICK, OF PARIS, FRANCE.

BACKPLATE FOR ARTIFICIAL TEETH.

Application filed February 15, 1924, Serial No. 693,134, and in France February 20, 1923.

My invention has for its object a back plate for artificial teeth intended to obviate all the disadvantages which are to be found in fixing the said back plate upon the cramps secured to the tooth, chiefly when the fixation is carried out by the soldering process.

To this end, the holes are pierced in the said plate in such manner that their spacing shall be exactly the same as that of the cramps; these holes are very closely calibrated. Upon the outer face of the plate and corresponding to the position of the holes, I provide apertured bosses forming flanges or collars which serve as an extension of the holes and constitute a sort of sheath which can be contracted or pressed upon the cramp extending through the same, the cramp being then flattened down upon the end of the sheath by a riveting action. By this method of attaching the plate, I am enabled to prevent all entrance of soldering metal or flux between the back plate and the tooth.

The appended drawing shows by way of example a constructional form of back plate in accordance with this invention.

Fig. 1 is a section of the tooth and back plate connected together by the cramp and before the succeeding operations.

Fig. 2 is a section of the tooth and back plate, with a restricted flanged part or collar.

The tooth 1 is attached to the back plate 2 by the cramps 3 which have been secured to the tooth, that is to say, after the tooth has been baked and the rear face ground off, the said cramps are soldered to the rings 4 which have been disposed in the mass of the tooth before the baking operation. The bosses 5 forming collars or flanges are provided at the points corresponding to the holes in the back plate serving to secure the tooth.

The back plate is prepared before mounting the same, in the following manner.

The two holes in the back plate which is to be attached to the tooth are both pierced at the same time, so that the exact parallel position and proper spacing shall be insured for each back plate, corresponding exactly to the calibrated distance between the cramps of a porcelain tooth. In the manufacture of the plates, the said flange is formed, and the two sheaths are made exactly parallel, by the use of a suitable tool. The said plates have a perfectly flat surface; they may be mounted upon the corresponding teeth and will fit closely upon the porcelain. Since the inner diameter of the said flange corresponds exactly to the spacing of the cramps, a perfectly tight fit can be obtained, either by riveting or preferably by upsetting as shown in Fig. 2, by means of a suitable tool whereof the two jaws inclose the outer part of the flange and press in this portion. The said flange is formed by pliers or like tools.

Claim:

In an artificial tooth, the combination of cramps secured to the tooth, a back plate in which are pierced holes adapted to receive said cramps, the said back plate having around each of these holes, on the external side as regards the tooth, a flange connected with said corresponding cramp by contracting this flange around the cramp.

In testimony that I claim the foregoing as my invention, I have signed my name.

BENVENUTO PLATSCHICK.